Figure 1:
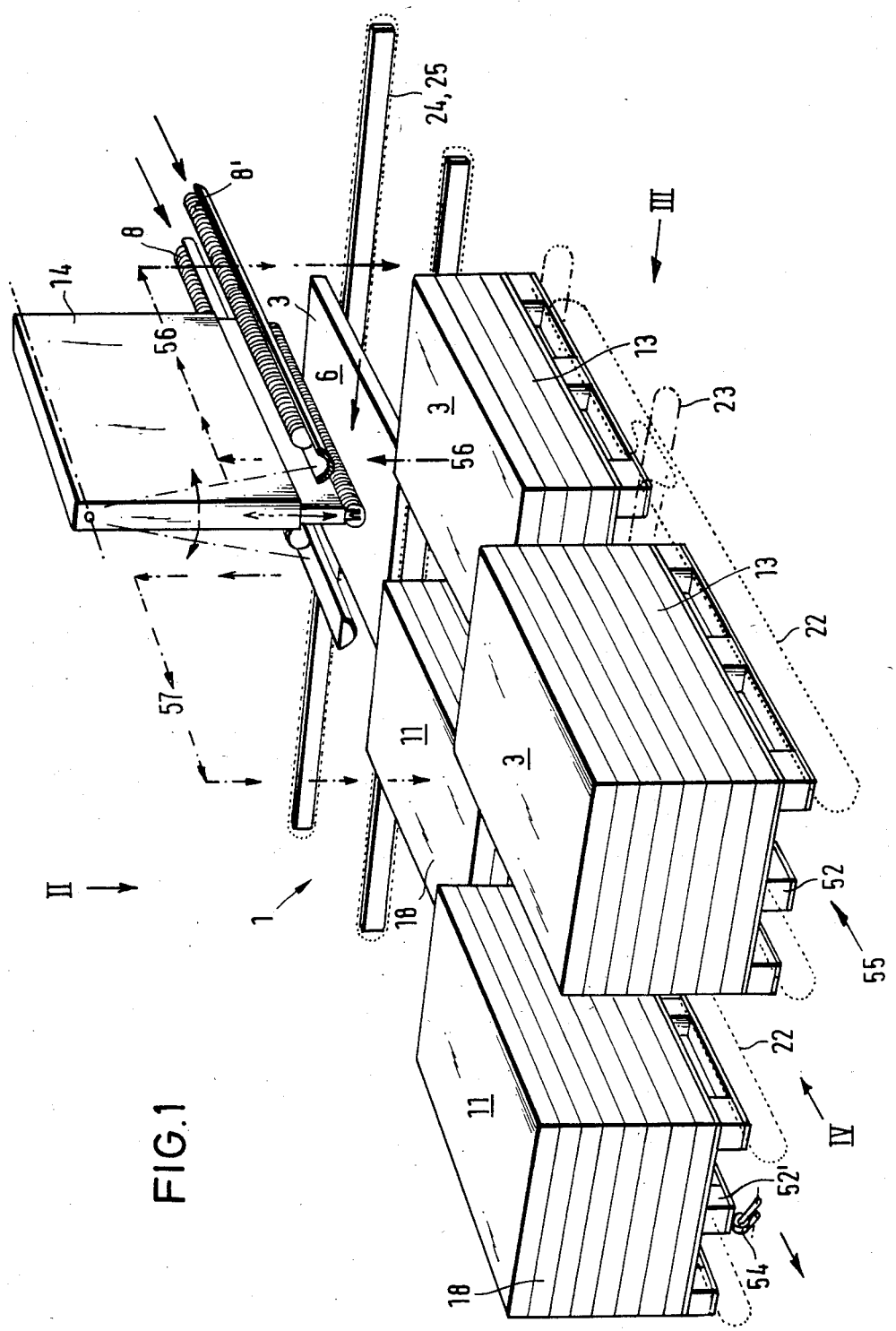

United States Patent [19]

Czajka et al.

[11] Patent Number: 4,568,231
[45] Date of Patent: Feb. 4, 1986

[54] METHOD AND EQUIPMENT FOR PALLETIZING AND DEPALLETIZING CAN-TOPS

[75] Inventors: Werner Czajka, Olfen; Reinhard Klahr, Munster-Roxel, both of Fed. Rep. of Germany

[73] Assignee: Magnettechnik NSM GmbH, Fed. Rep. of Germany

[21] Appl. No.: 511,888

[22] Filed: Jul. 8, 1983

[30] Foreign Application Priority Data

Aug. 2, 1982 [DE] Fed. Rep. of Germany ....... 3228855

[51] Int. Cl.⁴ .................. B65G 57/24; B65G 60/00
[52] U.S. Cl. ................................. 414/32; 414/68; 414/71; 414/74; 414/101; 414/110
[58] Field of Search ............ 414/71, 74, 101, 103, 414/110, 68, 330, 120, 57, 97, 102, 104, 128, 32, 222; 198/592, 472

[56] References Cited

U.S. PATENT DOCUMENTS

| | | | |
|---|---|---|---|
| 1,370,695 | 3/1921 | Lile | 414/103 |
| 1,490,235 | 4/1924 | Smith et al. | 414/71 |
| 2,119,561 | 6/1938 | Smith | 414/103 |
| 2,559,460 | 7/1951 | Peterson | 414/71 |
| 3,044,637 | 7/1962 | Repasky et al. | 414/102 X |
| 3,429,466 | 2/1969 | Puderbach | 414/32 X |
| 3,690,435 | 9/1972 | King et al. | 198/592 |
| 4,197,046 | 4/1980 | Shank | 414/68 |
| 4,302,142 | 11/1981 | Kuhl et al. | 414/120 |
| 4,468,163 | 8/1984 | King et al. | 414/110 |

FOREIGN PATENT DOCUMENTS 2030602 4/1978 Fed. Rep. of Germany ........ 414/97

Primary Examiner—Leslie J. Paperner
Assistant Examiner—Lyle Kim
Attorney, Agent, or Firm—Body, Vickers & Daniels

[57] ABSTRACT

A method and apparatus for handling can tops separates single layer can top grid frames from palletized stacks and loads and unloads the can tops automatically without damaging the can tops. The apparatus has five work stations interconnected by conveyors. Conveyors move the grid frames through the stations sequentially from the first station to the fifth station to depalletize or palletize can tops.

21 Claims, 11 Drawing Figures

METHOD AND EQUIPMENT FOR PALLETIZING AND DEPALLETIZING CAN-TOPS

The invention concerns a method and equipment for palletizing and depalletizing can-tops, using a can-top stacker, preferably of a vacuum type. Palletizing equipment is known which is associated with considerable disadvantages. One particular disadvantage is that the goods to be palletized are not handled gently enough, with the result, for example, that the lacquer is damaged. Nor is the reliablility of known palletizing equipment adequate; more particularly, there is no self-contained continuous process from feeding the empty pallet to removal of the full pallet, all at optimum efficiency. The aim of the invention is to provide a remedy here and eliminate the aforementioned disadvantages.

The invention solves the relevant problem by using a method and equipment for palletizing and depalletizing can-tops by means of a can-top stacker, preferably of the vacuum type, with piled empty grid frames being brought into the area of an empty grid frame transfer for the purpose of palletizing and from there being taken singly by the empty grid frame transfer to a loading cross transfer, after which the empty grid frames are filled in the latter by means of a string transfer which alternately takes the split string lengths from not less than two can-top channels of the can-top stacker and continuously places them in the next empty string pocket of the empty grid frame.

By means of the method in accordance with the invention a large pile of empty grid frames can therefore be brought immediately within the reach of the palletizing equipment by a fork lift or similar device. At this point this pile is automatically taken over by the palletizing equipment, i.e. the entire pile is first brought into a position in which the grid frames are fed one by one to a string transfer by means of a lift. The string transfer also automatically takes suitable string lengths from the can-top channels which have been filled by the can-top stacker (a vacuum can-top stacker, for instance) and transfers these string lengths in a preset cycle to the appropriate string pocket of the empty grid frame which is fed through beneath the loading beam of the string transfer. On completion of filling, the grid frames are automatically formed into a pile by a lift operating analogously in the opposite direction; after a given pile height has been reached the pile of grid frames is automatically delivered to an area that is accessible to a fork-lift truck or similar facility.

The depalletizing procedure takes place essentially in the reverse sequence, filled grid frames, i.e. full grid frames made up into a pile, being fed into the depalletizing facility, singled by the aforementioned lift and passed singly to a string transfer which feeds the string lengths taken from the string pockets of the grid frame to a corresponding can-top channel.

The equipment in accordance with the invention is characterized in detail by the fact that it consists of a basic frame containing essentially five functional spaces, the first of these accommodating a pile of empty grid frames and connecting via an empty grid frame transfer with the second functional space which accepts a single empty grid frame and hold it in a waiting position.

Immediately following this second functional space is the third containing the actual string transfer facility, i.e. the loading beam, the knife for separating the string length and a clearance bar for adequate spatial separation of the string length from the following string of can-tops. The clearance bar is especially important because it makes it possible for the can-top stacker to operate continuously without interruption while the string transfer shifts the individual string lengths.

The aforementioned third functional space is followed by a fourth which accepts the single, no longer empty grid frame (described here as full grid frame) and also holds it in the acceptance position enabling the lift (or grid frame transfer) to shift the full grid frame into the fifth functional space by means of the aforementioned facility used for piling the full grid frames. In actual practice the five functional spaces previously mentioned are arranged in the form of a horseshoe, the free limbs of the horseshoe forming the entry and exit points for the stacked grid frames and the crosspiece the string transfer facility.

A further design feature of the invention may be an additional pallet parking space preceding the first functional space; in addition, a further pallet parking space may follow the last functional space of the basic frame described in the aforegoing, this permitting feed and/or removal of the pallets—without the palletizing or depalletizing process having to be interrupted. The two pallet parking spaces mentioned are connected with the functional spaces following or preceding them by twin-chain conveyor by means of which the pallets can be transported. The successive pallets are fed automatically.

The functional space first mentioned, which accommodates the pallet with the empty grid frame, is connected with the last—named functional space accomodating a full grid frame in accordance with the invention by a liftable twin-chain transfer; this permits automatic transport of the empty pallet on which the empty grid frames have previously been placed into the functional space used for piling the empty full grid frames. In other word, the pallets proper do not have to be passed through the string transfer facility; in particular, this means that the overall height of the equipment can be reduced.

In order to enable the empty grid frames to be transported beneath the string transfer facility, the second functional space accommodating the empty grid frame in the waiting position, the third functional space accommodating the string transfer facility and the fourth functional space accommodating the individual full grid frames are interconnected via a cross transfer formed by a roller-chain conveyor. This loading cross transfer virtually passes through the entire "cross-piece" of the roughly horseshoe-shaped palletizing facility.

The individual grid frame is advantageously designed so that it has two rectangular hollow sections on the two parallel longitudinal sides which have centring cams and openings at the ends and are interconnected by orthogonal angle plates forming the string pockets. This grid frame design permits reliable precise pick-up of the individual grid frame by the grid frame transfer described subsequently; in addition, the individual grid frames are automatically centred during piling.

Within the framework of this invention the grid frame transfer forms a solution exhibiting independent inventive quality. Essentially, it consists of a lift facility travelling on rails of the basic frame which carries a lift frame that can be lifted and lowered. The lift frame is suspended from cloth elements, as they are called; this type of suspension automatically damps any oscillations when the grid frame is being shifted. The lift frame is powered by an electric motor with appropriate gear transmission; an additional intermediate gear transmission is provided so that the two cloth elements holding the lift frame can be wound on or out when the senses of rotation of the shafts are in mirror sense.

The liftframe proper consists essentially of a rectangular frame whose dimensions are basically tailored to those of the grid frame. At its four corners it has spring-loaded detent pawls engaging in the side openings of the hollow sections of the grid frame. The spring loaded detent pawls can be reset by a pneumatic cylinder; a pneumatic cylinder acts via an eccentric and corresponding control rods on two opposite detent pawls.

Power is best fed to the entire grid frame transfer facility via cabletrolleys guided by a guide rail, the guide rail in each instance being arranged above the first, second, fourth and fifth functional spaces.

The string transfer facility is also of further independent inventive significance within the framework of the invention presented here. This is essentially formed by a loading beam adjustable for height and angle within the basic frame. A can-top transfer strip which has a hollow section and a permanent magnet within it is provided at the bottom end of the loading beam at its lower free end. This permanent magnet can be positioned so that it automatically holds a can-top string length, and it can also be brought into a second position, in which the magnetic effect becomes ineffective, so that the loading beam and can-top transfer strip can detach themselves from the string length.

The string transfer facility further has—for each stack channel coming from the can-top stacker—a spring-loaded knife fixed to the basic frame by a holder which divides the string length from above. This cutting operation is performed at the instant in which a limit switch has enabled the pulse for this purpose. There are also—separately for each can-top channel as well—two side knives fixed to a release bar which are also used for dividing the string length and together with the release bar place the string length by means of a pneumatic cylinder in an unloading position. The unloading position corresponds to the position exactly beneath the loading beam; this means in the first instance that the loading beam can pick up the divided string length accurately; in the second instance it means that the can-top stacker can continue to operate in the meantime without interruption.

Dividing the can-top string from above makes sure there is a gap in the string in order to prevent the two side knives used to push free the can-top string from being inserted either in front of or behind the last separated can top when the can-tops are at a slight angle, since this would cause trouble in the system.

In accordance with the invention the loading beam proper is controlled by a pneumatic cylinder; this pneumatic cylinder is in the form of a cylinder with double stroke when two stack channels fed by the can-top stacker are used so that in each instance a complete stroke makes possible a half swivel motion and the stroke of both cylinders the complete swivel motion. The cylinders therefore travel into their end positions every time.

The same function could be achieved by using electric-motor drive; with this method the three positions of the loading beam would be approached using scanning by sensors.

The can-top transfer strip has tongues at the end with the help of which the free ends of the string length can be reliably gripped; after the relevant string length has been placed in the string pockets of the grid frame to be filled, pneumatic thrust cylinders supported by the basic frame briefly compress the string length; this enables the loading beam to detach itself from the string length without the tongues being a hindrance.

Since when a number of can-top channels are used—for instance two or three—the loading beam has to take a string length as the next one from the can-top channel which is filled the most, initiators for controlling the loading beam in accordance with the quantity filled in the relevant can-top channel are provided in the area of the string transfer facility at the can-top channels.

It is obvious that the individual operations have to be precisely interlinked in order to ensure reliable functioning right up to the time the piled full grid frames are removed. Within the overall design of the invention the roller chain of the loading cross transfer which transports the grid frames to be filled is therefore of special design.

For this purpose every second pin in one of the two roller chains is extended in length towards the outside, i.e. it has a chain pin extended in length on the outer side which, in conjunction with an initiator fixed on the basic frame, provides the pulse for the motion cycle of the roller chain. This means that the spacing of the grids in the grid frame is matched to the pitch of the roller chain, the roller chain in turn operating in synchronism with the loading beam cycle and the operating cycle of the string transfer facility as a whole.

In order to ensure unhindered passage of the finally filled grid frame and equally unhindered follow-up of the next grid frame to be filled, depending on the length of a grid frame the extended chain pins on the roller chain are omitted, i.e. the roller chain does not stop again until the next string pocket is immediately beneath the loading beam.

Using another method, the extended chain pins could be dispensed with. In that case the string pockets would be scanned directly by sensors.

The invention is discussed in further detail by reference to a practical example.

FIGURES

Figure 2:
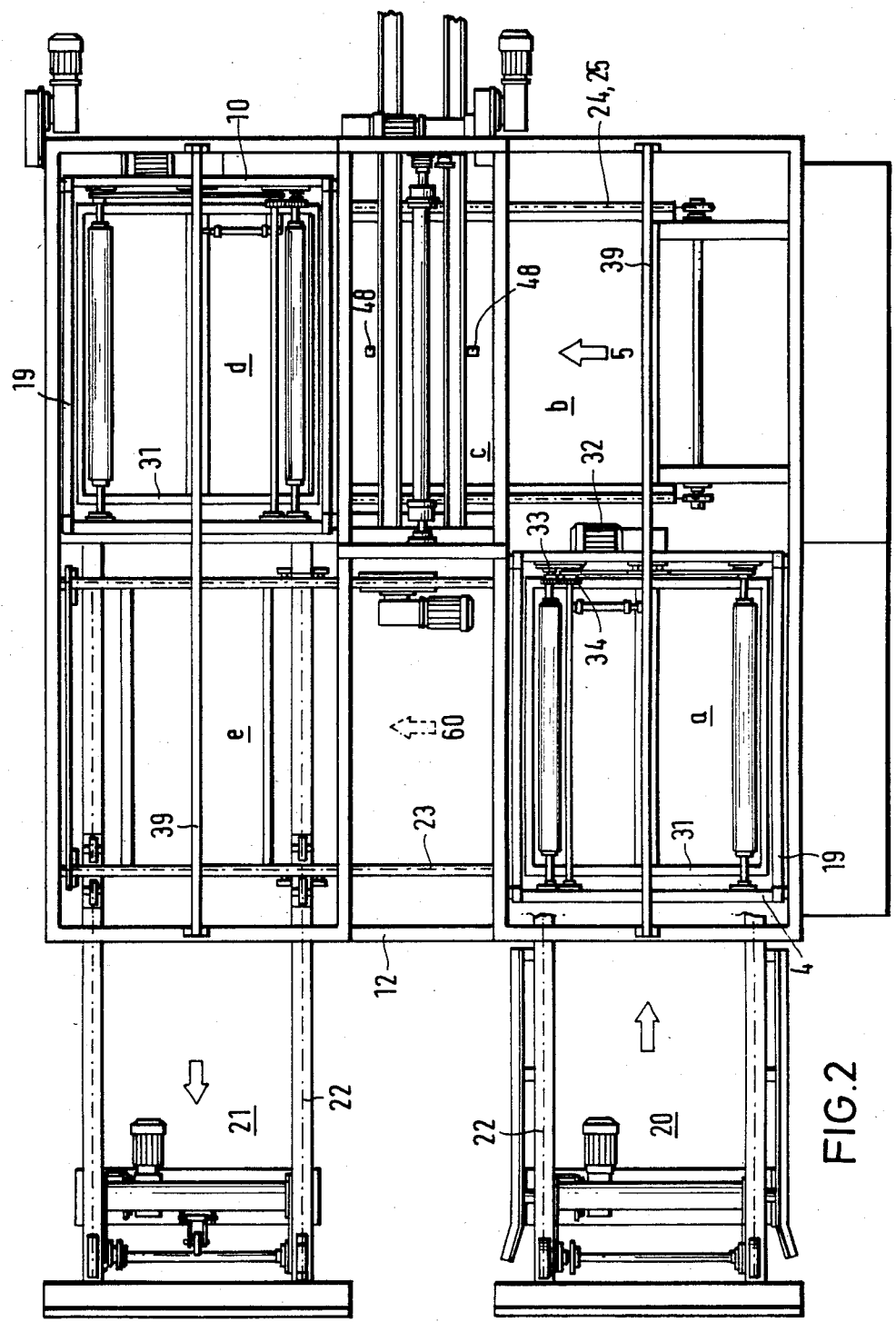

FIG. 1 A schematic diagram of the motion cycle in the palletizing facility showing the spatial relationships FIG. 2 A plan view of the palletizing facility as per II in FIG. 1

Figure 3:
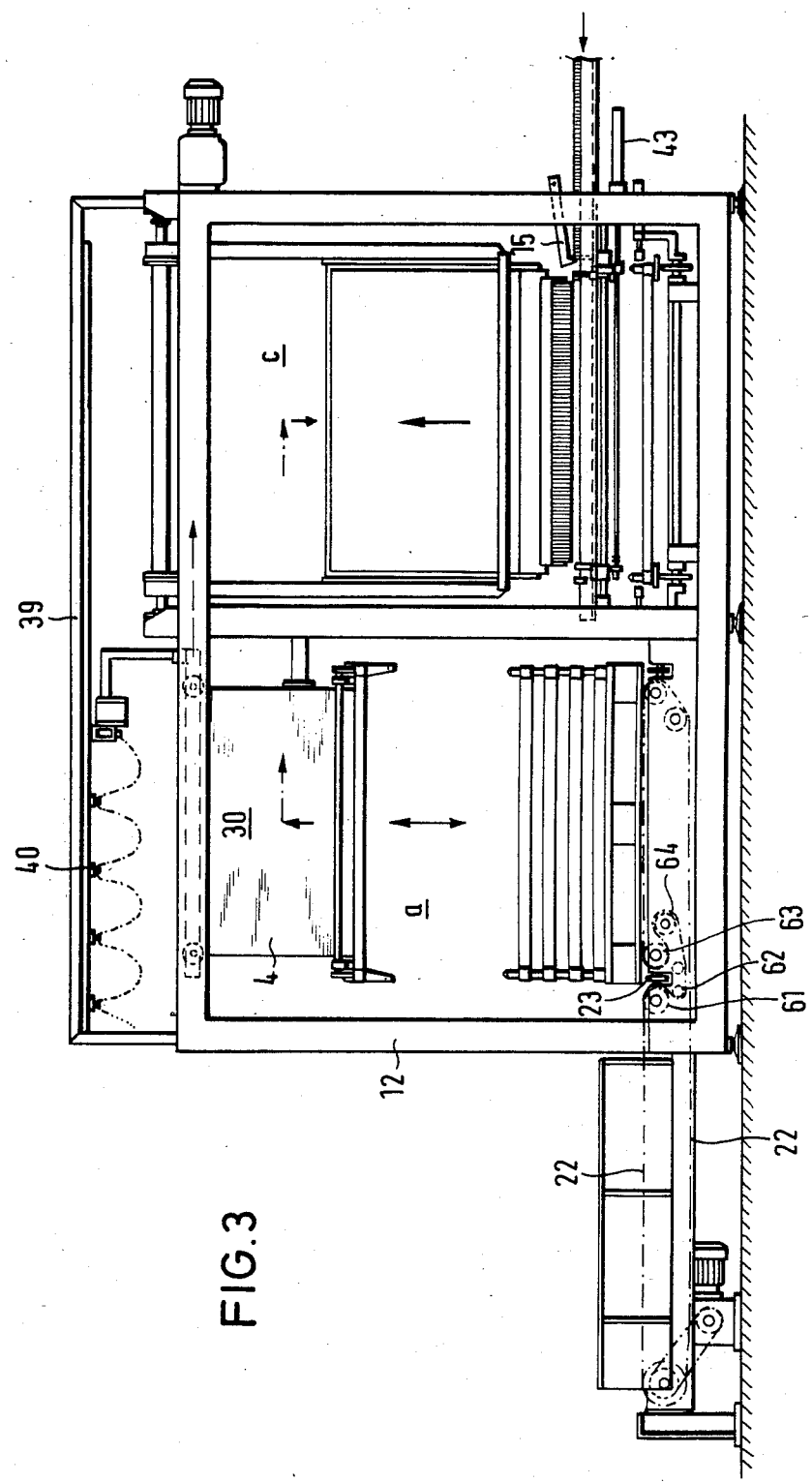

FIG. 3 Side view of the palletizing facility as per III in FIG. 1

Figure 4:
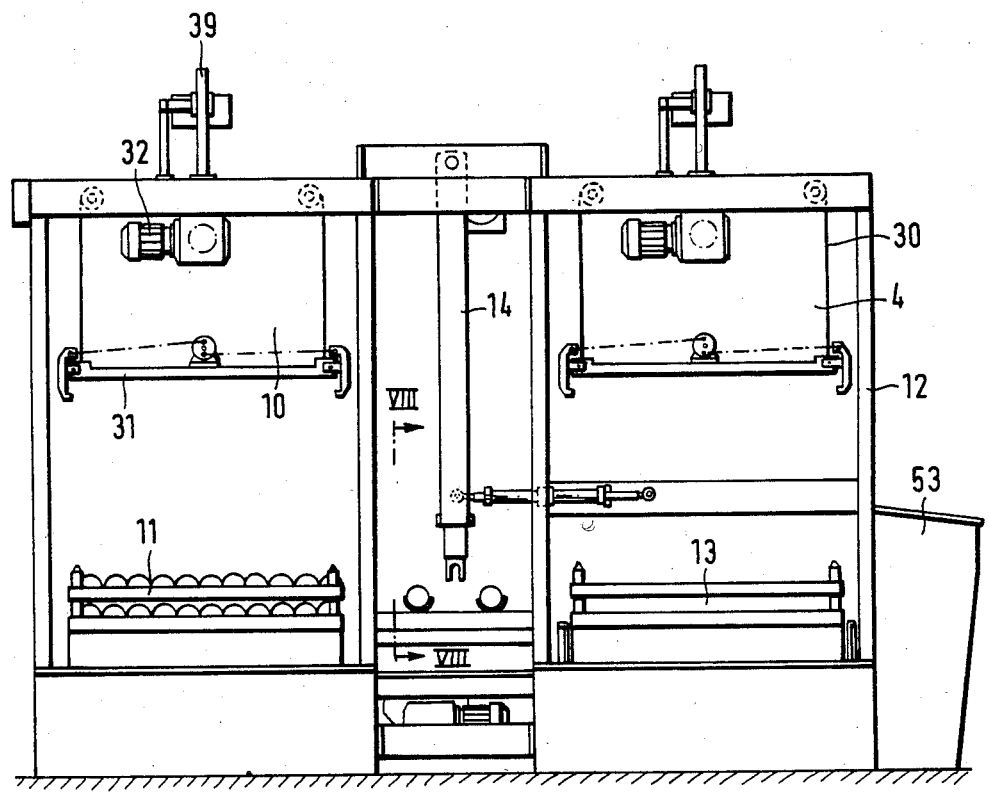

FIG. 4 A front view of the palletizing facility as per IV in FIG. 1

Figure 5:
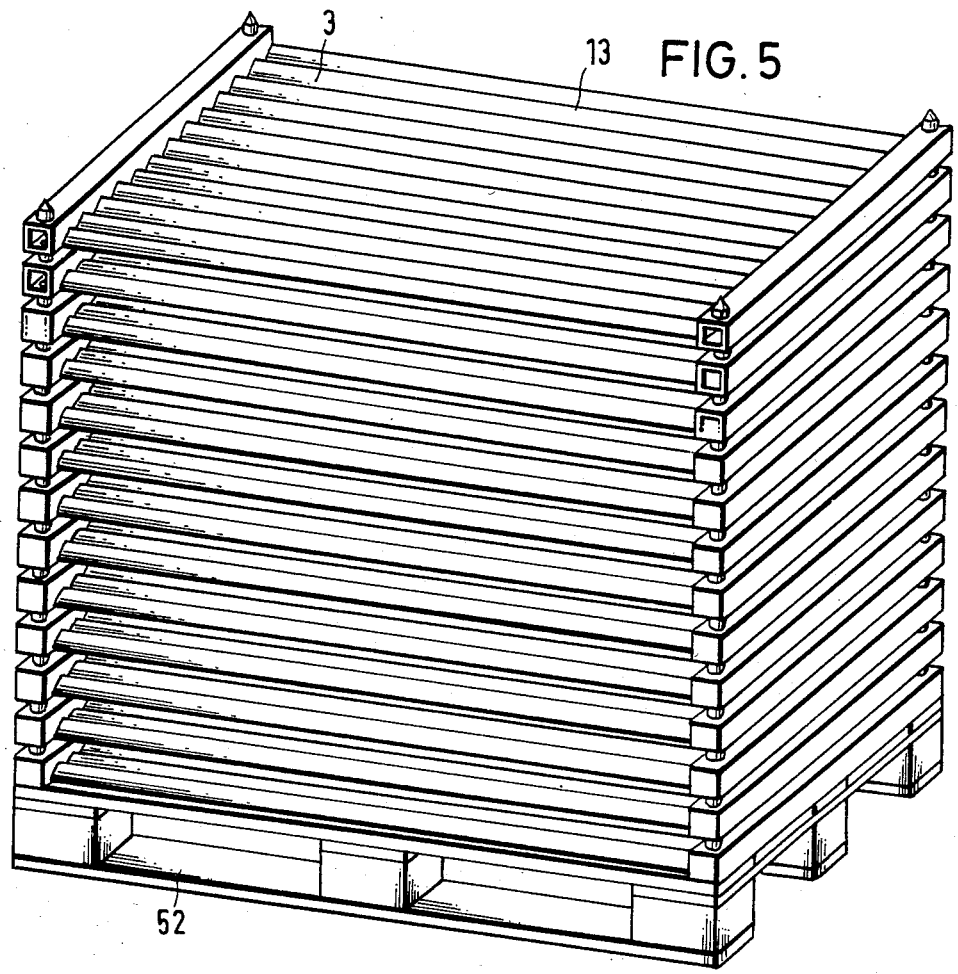

FIG. 5 Spatial diagram of a pallet with piled empty grid frames

Figure 6:
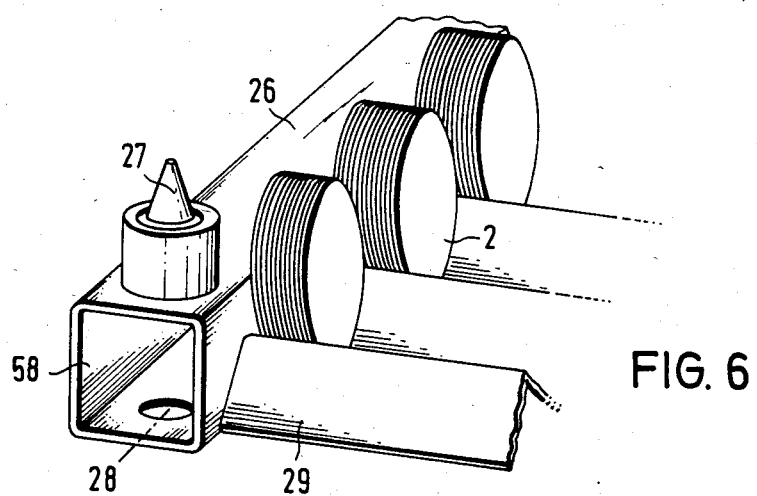

FIG. 6 An enlarged, spatial representation of a detail of an empty grid frame as per FIG. 5

Figure 7:
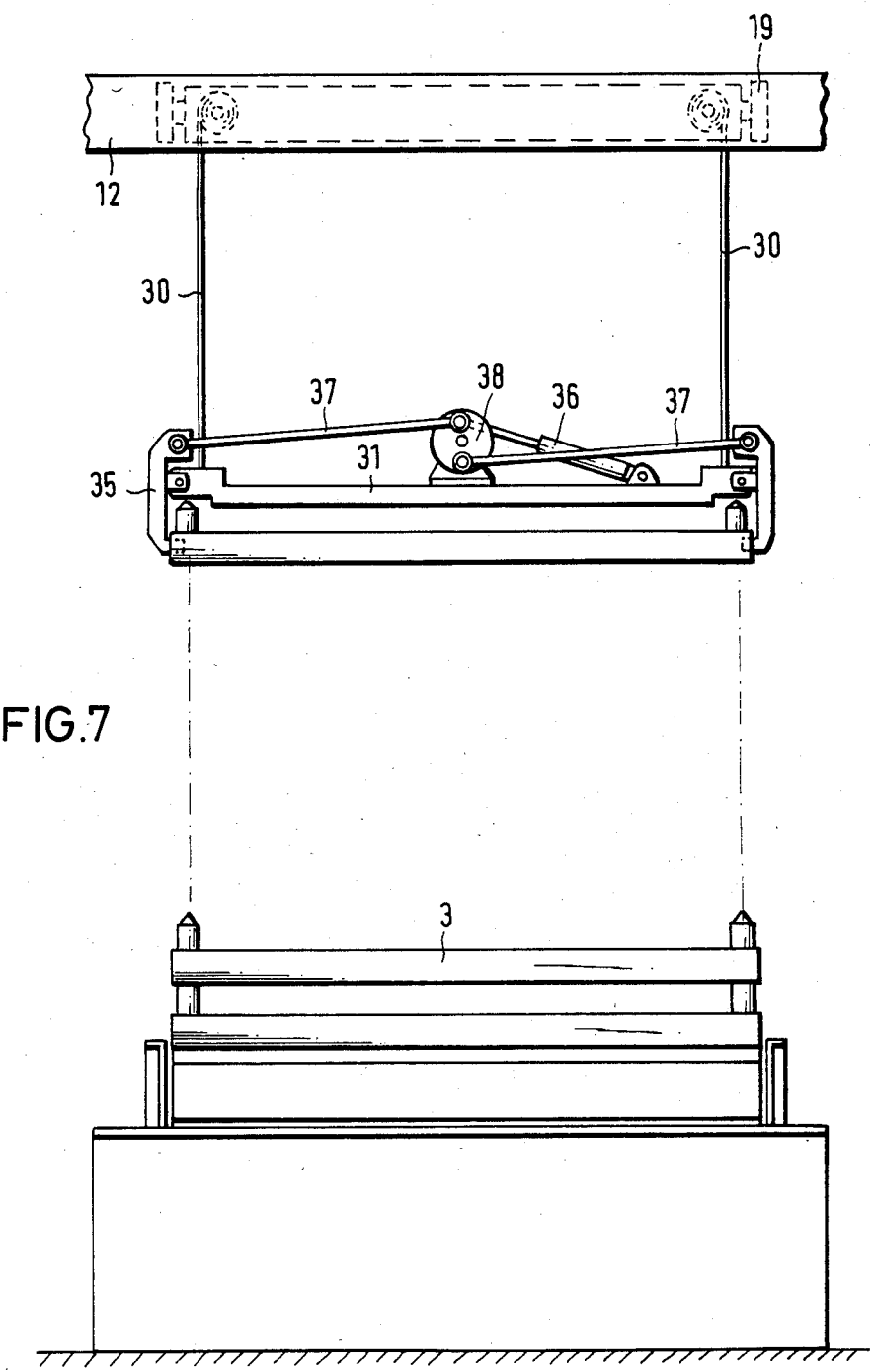

FIG. 7 Details of the lift frame enlarged as compared with FIGS. 2–4

Figures 8, 9:
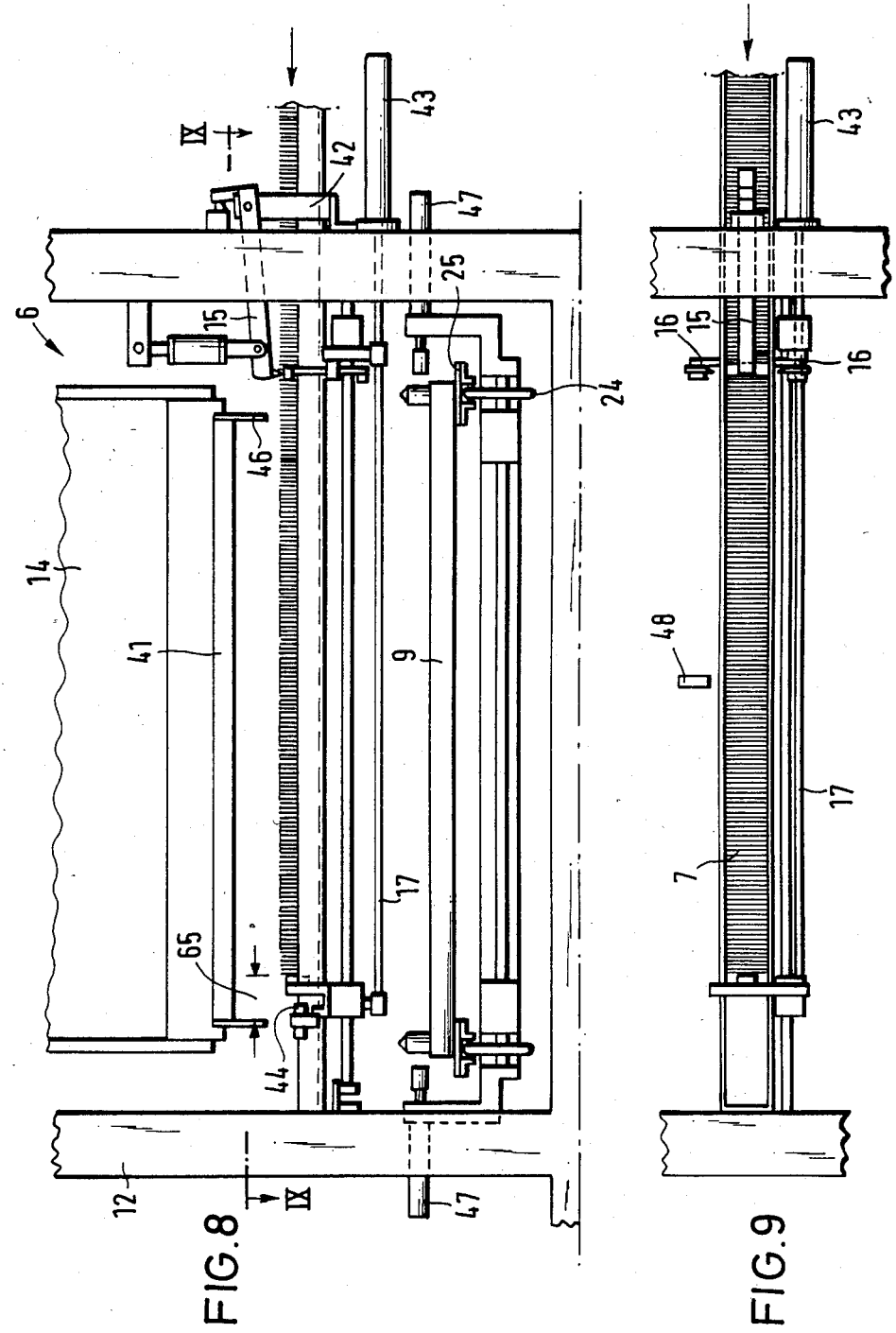

FIG. 8 Enlarged representation of the section VIII—VIII as per FIG. 4

FIG. 9 Section IX—IX as per FIG. 8

Figure 10:
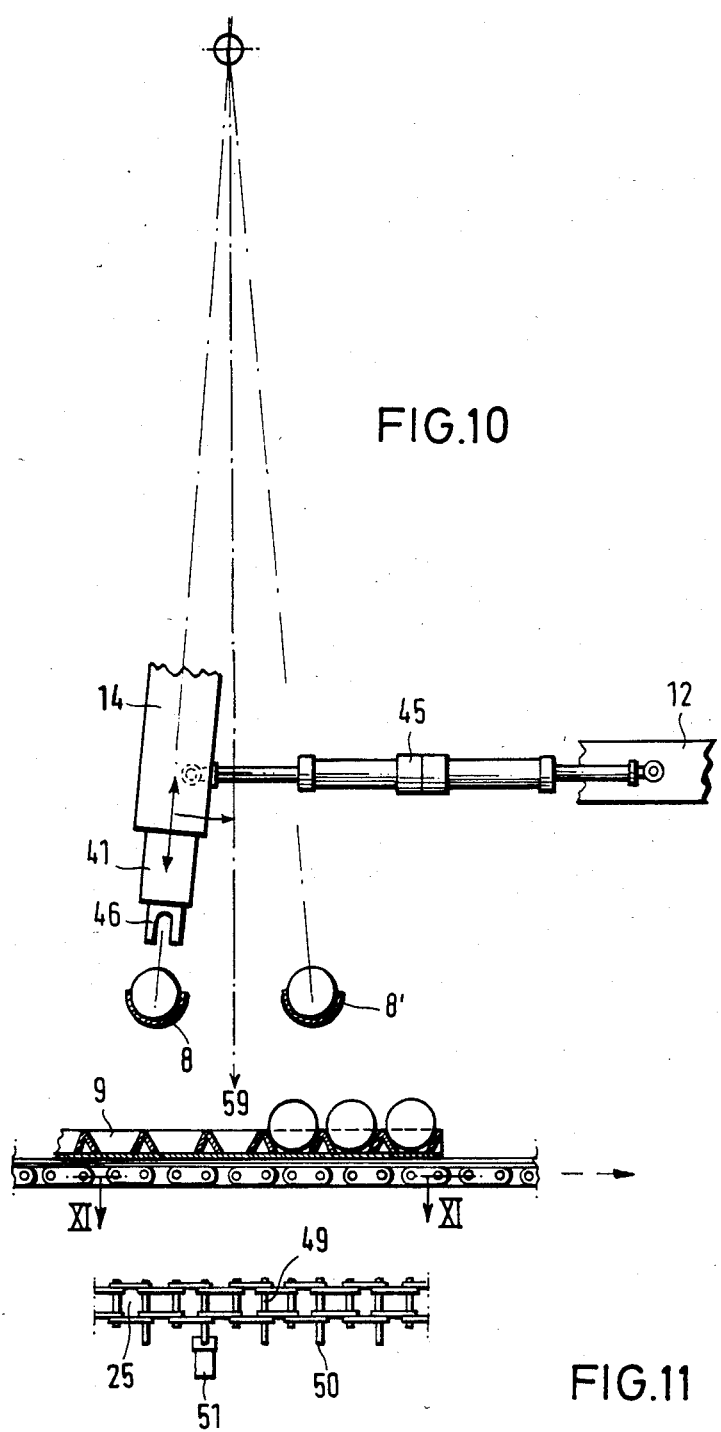

FIG. 10 A part side view of the loading beam

Figure 11:
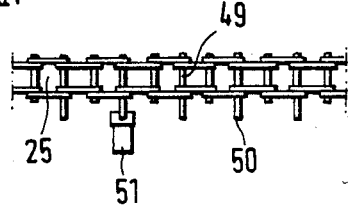

FIG. 11 Plan view of the roller chain of the loading cross transfer

FIG. 1 shows a spatial, schematic diagram of the operating cycle during palletizing. The palletizing facility is marked 1. Two can-top channels 8 and 8' lead from the can-top stacker (not shown) to the area of the string transfer 6.

By means of a fork-lift truck or similar equipment a pallet 52 loaded with empty grid frames 3 is brought into the area of a double chain transfer 22 for transporting pallets. As soon as the pile 13 of empty grid frames has been removed by the frame transfer facility not shown here, the double chain transfer 22 is activated and the pile whose pallet is designated 52 advances in the direction of arrow 55. A frame transfer indicated by the arrow 56 transports the empty grid frame into the reach of roller chain 24 of the loading cross transfer 25. The empty grid frame 3 is then travelled incrementally under the loading beam 14; the loading beam 14 alternately takes from can-top channel 8 and 8' a string length and after swivelling lowers it into the string pockets 9 (see FIG. 11) of the empty grid frame 3. The empty grid frame travels to the left as seen in FIG. 1 into its end position and is there transported in the direction of arrow 57 by a suitable frame transfer facility (full grid frame transfer 10, FIG. 4) and fed to a full grid frame pile 11. The full grid frame is designated 18.

After a certain pile height has been reached, monitored by a photoelectric beam, the pile thus formed travels over the double chain transfer 22 into the position in which the pallet 52' just removed was located. A limit switch 54 ensures that the double chain transfer 22 is switched off at the right time.

From FIGS. 2–4 it can be seen that the palletizing facility 1 is roughly the shape of a horseshoe in plan (FIG. 2). This horseshoe-shaped plan layout virtually forms five functional spaces designated a to e. FIG. 2 shows that starting from the pallet parking space 20 the pallet with the empty grid frames is first taken to functional space a. This is done by means of the double chain transfer 22. The lift trolley designated 19, with the aid of the lift frame 31 (see also FIG. 7) accepts the empty grid frame. When the lift frame is lowered onto the empty grid frame the cloth elements 30 are detensioned and therefore release the detent pawls 35 that can engage in the holes 58 (FIG. 6) of the grid frame. The empty grid frame is lifted via an electric motor 32 followed a gear transmission 33 and another gear transmission 34 for the opposite direction and is then transported to the right by a roller-mounted lift trolley 19 (FIG. 2). Power is supplied via a cable trolley 40 mounted on a guide rail 39. The empty grid frame transfer facility 4 takes the empty grid frame into the functional space designated b and lowers it there into a waiting position about 30 cm above the roller chain 24 of the loading cross transfer 25. This position is controlled by a photoelectric beam.

As soon as the string transfer facility 6 in the functional space c enables the further sequence, the empty grid frame 3 is lowered and taken over by the loading cross transfer 25. The roller chain 24 of the loading cross transfer travels the empty grid frame into the area of the string transfer facility 6, when further travel of the roller chain is stopped as soon as externally lengthened pins 50 has tripped the initiator 51 on the basic frame 12 of the palletizing facility 1 (see FIG. 11). The loading beam 14 then takes a string length 7 from one of the two can-top channels 8 and 8' and places it in string pocket 9 of the empty grid frame. This operation takes place as follows:

When two can-top channels 8 and 8' are used, the loading beam 14 assumes the basic position shown in FIG. 10 above the can-top channel which is filled the most (in this case item 8). The degree to which the channels are filled is monitored by initiators (FIG. 2, item 48). As soon as the can-top channel 8 is sufficiently filled (FIG. 8), the limit switch 44 is actuated and serves as pulse transmitter for dividing the string length 7. First of all, a top knife 15 fixed to the basic frame 12 by a holder 42 is inserted into the string formed by individual can-tops 2, movement being from the top downwards. After that, two side knives 16 (FIG. 9) mounted on a clearance bar 17 completely separate the string length, whereupon the clearance bar 17 together with the string length, is travelled by a pneumatic cylinder 43 to the left as seen in FIGS. 8 and 9 into a position in which the tongues 46 of the loading beam can grip the outside of the free end of the string length 7. The shift distance is designated 65 in FIG. 8. The loading beam is then lowered onto string length 7, the can-top transfer strip 41 of the loading beam being brought into contact with the can-tops. Simultaneously, a permanent magnet in the can-top transfer strip 41 is controlled by a lever mechanism in such a way that the can-tops are held under the transfer strip 41 without additional external pressure. The loading beam subsequently lifts off upwards, swivels toward the centre and places the string of can-tops in the direction of the arrow 59 (FIG. 10) into the string pocket 9 provided for the purpose. After the can-top string has been lowered, the pneumatic pressure cylinders 47 (shown in FIG. 8) fixed to the basic frame are extended and compress the string length until, after the permanent magnet has been switched, the tongues at the end of the string length are released so that the loading beam 14 and transfer strip 41 can be lifted off for the next phase of the operating cycle. Lifting of the loading beam simultaneously enables the pulse for advancing the roller chain 24 of the loading cross transfer 25.

From FIG. 10 it can further be seen that a pneumatic cylinder 45 essentially consisting of two individual cylinders is used for the swivel motion of loading beam 14, so that each of the two cylinders can perform half of the necessary swivel motion and in this way one can-top string can alternately be taken from can-top channel 8 and 8'.

On completion of the loading cycle, the grid frame now designated as full grid frame 18 travels on into the area of functional space d and is taken over by a full grid frame transfer 10 operating in similar fashion and transported into functional space e, the single full grid frames 18 being formed into a pile 11 of full grid frames. Further operations are as described with reference to FIG. 1; it should be noted here that the double chain cross transfer 23 shown in FIG. 1 can be raised so that it can directly transport the empty pallets from space a in the direction of arrow 60 (FIG. 2) into space e. In order to make possible the configuration of the double chain cross transfer 23, the double chain transfer 22 for pallet transport (see FIG. 3) has not less than four return sprockets 61, 62, 63 and 64, one of them, preferably return sprocket 64, being tensionable.

It can be seen from FIG. 6 that the individual grid frame consists of side hollow sections 26, centring cams 27 and mating centring holes 28 being provided at the four corners of these hollow sections. The longitudinal hollow sections 26 are interconnected by angle section 29 which simultaneously form the string pockets 9.

The detent pawls 35 (see FIG. 7) engaging in the end holes 58 are tensioned in the locked position by springs not shown in the diagram; they are disengaged by pneumatic cylinder 36 acting via eccentric 38 on the control rods 37; control is such that when the lift frame 31 descends onto a grid frame, because of detensioning of the cloth elements 30 the pneumatic cylinder 36 is actuated and the detent pawls 35 engage.

There is no need to further explain that the individual operations of the operating cycle are performed within the framework of sequential control; the invention makes use here of known facilities.

We claim:

1. A method of loading a row of thin flat objects of indeterminate length onto a plurality of grid frames each having a plurality of pockets and palletizing said grid frames, comprising the steps of:

(a) providing a pallet containing a stack of empty grid frames in a first pallet receiving area and an empty pallet in a second pallet receiving area; said first and second pallet receiving areas being transversely adjacent to one another;
   (b) automatically transferring a single grid frame from said stack of empty grid frames to a single grid frame receiving area longitudinally adjacent to said first pallet receiving area;
   (c) transversely conveying said single grid frame on a conveyor to a transfer area such that a first one of said pockets is located in a loading position;
   (d) separating a string of objects of predetermined length from said row of thin flat objects and depositing said string into said pocket in said loading position;
   (e) transversely advancing said conveyor such that the next adjacent empty pocket is in said loading position;
   (f) repeating steps (d) and (e) until the pockets on said grid frame are filled;
   (g) transversely advancing said conveyor such that said filled grid frame is moved to a single grid frame off-loading area;
   (h) automatically transferring said filled single grid frame to said pallet in said second pallet receiving area longitudinally adjacent said single grid frame off-loading area;
   (i) repeating steps (b) through (h) until said pallet in said first pallet receiving area is empty and said pallet in said second pallet receiving area is full;
   (j) removing said filled pallet from said second pallet receiving area to a first pallet parking space;
   (k) automatically transversely conveying said pallet in said first pallet receiving area to said transversely adjacent second pallet receiving area; and,
   (l) conveying a pallet containing a stack of empty grid frames from a second pallet parking space to said first pallet receiving area.

2. A method of unloading objects from a plurality of palletized grid frames each having a plurality of pockets and palletizing said unloaded grid frames comprising the steps of:

(a) providing a pallet containing a stack of full grid frames in a first pallet receiving area and an empty pallet in a second pallet receiving area said first and second pallet receiving areas being transversely adjacent to one another;
   (b) automatically transferring a single grid frame from said stack of full grid frames to a single frame receiving area longitudinally adjacent to said first pallet receiving area;
   (c) transversely conveying said single grid frame on a conveyor to a transfer area such that a first one of said pockets is located in an unloading position;
   (d) removing a string of objects from said pocket in said unloading position and depositing said string into a receiving channel;
   (e) transversely advancing said conveyor such that the next adjacent pocket is in said unloading position;
   (f) repeating steps (d) and (e) until said grid frame is emptied;
   (g) transversely advancing said conveyor such that said emptied grid frame is moved to a single grid frame off-loading area;
   (h) automatically transferring said emptied single grid frame to said pallet in said second pallet receiving area longitudinally adjacent said single grid frame off-loading area;
   (i) repeating steps (b) through (h) until said pallet in said first pallet receiving area is empty and said pallet in said second pallet receiving area is full;
   (j) removing said filled pallet from said second pallet receiving area to a first pallet parking space;
   (k) automatically transversely conveying said pallet in said first pallet receiving area to said transversely adjacent second pallet receiving area; and,
   (l) conveying a pallet containing a stack of full grid frames from a second pallet parking space to said first pallet receiving area.

3. Apparatus for loading thin flat objects available as an axially aligned row of indeterminate length in at least one object delivery channel onto grid frames having a plurality of pockets and palletizing said grid frames comprising, in combination:

a first pallet receiving area adapted to receive a first pallet supporting a plurality of stacked empty grid frames;
   a grid frame cross transfer conveyor longitudinally adjacent said first pallet receiving area having a single grid frame receiving area, a string transfer area and a single grid frame off loading area, transversely adjacent one another;
   a first grid frame transfer means adapted to remove one of said empty grid frames from said first pallet and position said empty grid frame on said grid frame cross transfer conveyor in said single grid frame receiving area;
   string transfer means adapted to engage a string of said axially aligned objects of predetermined length in one of said channels, remove said string of objects from said channel, deposit said string of objects in one of said pockets located in a string loading position in a grid frame located in said string transfer area and disengage said string of objects;
   drive means adapted to transversely advance said grid frame cross transfer conveyor actuated by said string transfer means disengaging said string of objects;
   sensing means adapted to sense the presence or absence of an adjacent empty string pocket in said grid frame located in said string transfer area; stop said drive means such that said adjacent empty string pocket is positioned in said string loading position in the presence of an adjacent empty string pocket; and, cause said drive means to advance said grid frame located in said string transfer area into said single grid frame off-loading area in the absence of an adjacent empty string pocket;

second grid frame transfer means adapted to engage said single grid frame in said single grid frame off-loading area and deposit said grid frame on a stack of filled grid frames on a second pallet in a second pallet receiving area longitudinally adjacent said grid frame off-loading area and transversely adjacent said first pallet receiving area; and, said first pallet receiving area being connected to said second pallet receiving area by a pallet cross transfer conveyor parallel to said grid frame cross transfer conveyor adapted to convey empty pallets to said second pallet receiving area.

4. The apparatus of claim 3 wherein said first pallet receiving area is connected by a first pallet conveyor to a first pallet parking area and said second pallet receiving area is connected by a second pallet conveyor to a second pallet parking area.

5. The apparatus of claim 4 wherein said first pallet conveyor is parallel to said second pallet conveyor and said first and second pallet conveyors are perpendicular to said pallet cross transfer conveyor.

6. The apparatus of claim 3 wherein said grid frames each comprise two parallel rectangular side members having upper surfaces and lower surfaces interconnected by a plurality of cross members perpendicular to said side members defining V-shaped pockets, said side members having centering projections disposed at selected locations on said side member upper surface and centering apertures at selected locations in said side member lower surfaces.

7. The apparatus of claim 3 wherein said first grid frame transfer means and said second grid frame transfer means are comprised of lift frames suspended by cloth suspension element from overhead lift trolleys.

8. The apparatus of claim 7 wherein said lift trolleys further comprise electric drive motors and drive reversing means for raising and lowering said grid frames.

9. The apparatus of claim 7 wherein said lift frames comprise a frame and pawls supported on said frame, said pawls adapted to engage lifting apertures in said grid frames.

10. The apparatus of claim 3 wherein said grid frame cross transfer conveyor is a roller chain conveyor, said conveyor having stubs extending from one side thereof such stubs being spaced along said conveyor a distance, one from the next identical to the distance between the centers of adjacent pockets in said grid frames, said stubs coacting with said sensing means.

11. The apparatus of claim 10 wherein said stubs are positioned on said conveyor only in positions corresponding to positions to be occupied by grid frames.

12. Apparatus for unloading thin flat objects from grid frames having a plurality of pockets containing said objects and palletizing said grid frames comprising, in combination:

(a) a first pallet receiving area adapted to receive a first pallet supporting a plurality of stacked full grid frames;

(b) a grid frame cross transfer conveyor longitudinally adjacent said first pallet receiving area having a single grid frame receiving area, a string transfer area and a single grid frame off-loading area;

(c) first grid frame transfer means adapted to remove one of said full grid frames from said first pallet and position said full grid frame on said grid frame cross transfer conveyor in said single grid frame receiving area;

(d) string transfer means adapted to engage a string of said objects in one of said pockets located in a string unloading position, remove said string of objects, deposit said string of objects in a channel and disengage said string of objects;

(e) drive means adapted to advance said grid frame cross transfer conveyor actuated by said string transfer means disengaging said string of objects;

(f) sensing means adapted to sense the presence or absence of an adjacent full pocket in said grid frame located in said string transfer area; stop said drive means such that said adjacent full pocket is positioned in said string unloading position in the presence of an adjacent full pocket; and cause said drive means to advance said grid frame located in said string transfer area into said single grid frame off loading area in the absence of an adjacent full pocket;

(g) second grid frame transfer means adapted to engage said single grid frame in said single grid frame off-loading area and deposit said grid frame on a stack of empty grid frames on a second pallet in a second pallet receiving area longitudinally adjacent said grid frame off-loading area and transversely adjacent said first pallet receiving area; and, (h) said first pallet receiving area being connected to said second pallet receiving area by a pallet cross transfer conveyor parallel to said grid frame cross transfer conveyor adapted to convey empty pallets to said second pallet receiving area.

13. The apparatus of claim 12 wherein said grid frame cross transfer conveyor is a roller chain conveyor, said conveyor having stubs extending from one side thereof, such stubs being spaced along said conveyor a distance, one from the next, identical to the distance between the centers of adjacent pocket in said grid frames, stubs coacting with said sensing means.

14. The apparatus of claim 13 wherein said stubs are positioned on said conveyor only in positions corresponding to positions to be occupied by grid frames.

15. The apparatus of claim 12 wherein said first pallet receiving area is connected by a first pallet conveyor to a first pallet parking area and said second pallet receiving area is connected by a second pallet conveyor to a second pallet parking area.

16. The apparatus of claim 15 wherein said pallet cross transfer conveyor is a raisable double chain conveyor.

17. Apparatus for loading thin flat objects available as an axially aligned row of indeterminate length in at least one object delivery channel onto grid frames having a plurality of pockets and palletizing said grid frames comprising, in combination:

a first pallet receiving area adapted to receive a first pallet supporting a plurality of stacked empty grid frames;

a grid frame cross transfer conveyor having a single grid frame receiving area, a string transfer area and a single grid frame off loading area;

a first grid frame transfer means adapted to remove one of said empty grid frames from said first pallet and position said empty grid frame on said cross transfer conveyor in said single grid frame receiving area;

string transfer means adapted to engage a string of said axially aligned objects of predetermined length in one of said channels, remove said string of objects from said channel, deposit said string of objects in one of said pockets located in a string loading position in a grid frame located in said string transfer area and disengage said string of objects;

drive means actuated by said string transfer means disengaging said string of objects advancing said cross transfer conveyor;

sensing means sensing the presence or absence of an adjacent empty string pocket in said grid frame located in said string transfer area; stopping said drive means such that said adjacent empty string pocket is positioned in said string loading position in the presence of an adjacent empty string pocket; and, causing said drive means to advance said grid frame located in said string transfer area into said single grid frame off loading area in the absence of an adjacent empty string pocket;

second grid frame transfer means engaging said single grid frame in said single grid frame off loading area and depositing said grid frame on a stack of filled grid frames on a second pallet in a second pallet receiving area; and said first grid frame transfer means and said second grid frame transfer means are comprised of lift frames suspended by cloth suspension element from overhead lift trolleys, said lift trolleys further comprise electric drive motors and drive reversing means for raising and lowering said grid frames, and said lift frames comprise a frame and pawls supported on said frame, said pawls adapted to engage lifting apertures in said grid frames and pneumatic resetting means acting through an eccentric wheel and control rods disengaging said pawls from said grid frame lifting apertures.

18. Apparatus for loading thin flat objects available as an axially aligned row of indeterminate length in at least one object delivery channel onto grid frames having a plurality of pockets and palletizing said grid frames comprising, in combination:

a first pallet receiving area adapted to receive a first pallet supporting a plurality of stacked empty grid frames;

a grid frame cross transfer conveyor having a single grid frame receiving area, a string transfer area and a single grid frame off loading area;

a first grid frame transfer means adapted to remove one of said empty grid frames from said first pallet and position said empty grid frame on said cross transfer conveyor in said single grid frame receiving area;

string transfer means adapted to engage a string of said axially aligned objects of predetermined length in one of said channels, remove said string of objects from said channel, deposit said string of objects in one of said pockets located in a string loading position in a grid frame located in said string transfer area and disengage said string of objects; said string transfer means comprising a loading beam having an object transfer strip at its lower end adapted to engage a string of said objects and carry said objects to said string loading position; and, top knives supported in frames above each of said channels, said top knives dividing said row of objects into strings of predetermined length for engagement by said transfer strip, said top knives being actuated by operation of a limit switch;

drive means actuated by said string transfer means disengaging said string of objects advancing said cross transfer conveyor;

sensing means sensing the presence or absence of an adjacent empty string pocket in said grid frame located in said string transfer area; stopping said drive means such that said adjacent empty string pocket is positioned in said string loading position in the presence of an adjacent empty string pocket; and, causing said drive means to advance said grid frame located in said string transfer area into said single grid frame off loading area in the absence of an adjacent empty string pocket;

second grid frame transfer means engaging said single grid frame in said single grid frame off loading area and depositing said grid frame on a stack of filled grid frames on a second pallet in a second pallet receiving area.

19. The apparatus of claim 18 wherein said string transfer means further comprises two side knives slidably mounted on a clearance bar at the end of each said channel, said side knives engaging said strings of predetermined length separated by said top knives and moving said strings to pick off positions.

20. The apparatus of claim 18 wherein there is provided at least two object delivery channels and said loading beam is controlled by a double stroke pneumatic cylinder.

21. The apparatus of claim 18 wherein said string transfer means further comprises pneumatic cylinders at both ends of said string loading position engaging a loaded string prior to disengagement of said object transfer strip and disengaging said string after said transfer strip is disengaged.

* * * * *